Feb. 15, 1949.    A. H. B. WALKER    2,461,861
APPARATUS FOR FREQUENCY MULTIPLICATION
OF ALTERNATING ELECTRIC CURRENTS
Filed May 2, 1945

INVENTOR.
Alec Hervey Bennett Walker.
BY
HIS ATTORNEY

Patented Feb. 15, 1949

2,461,861

UNITED STATES PATENT OFFICE 2,461,861

APPARATUS FOR FREQUENCY MULTIPLICATION OF ALTERNATING ELECTRIC CURRENTS

Alec Hervey Bennett Walker, London, England, assignor, by mesne assignments, to The Union Switch and Signal Company, Swissvale, Pa., a corporation of Pennsylvania Application May 2, 1945, Serial No. 591,525
In Great Britain July 11, 1944

1 Claim. (Cl. 172—281)

This invention relates to apparatus for frequency multiplication of alternating electric currents of the kind in which the frequency multiplication is effected by causing continuously successive half waves of current, of the frequency to be multiplied and of the same sign, to flow in the circuit in which current of the multiple frequency is required, either by reversing alternate half-waves of a single phase alternating current supply by means of a full wave rectifier device or by preventing the flow of current in alternate half-waves in each phase of a polyphase current supply by means of a suitable rectifier.

The unidirectional current flowing in the circuit to be supplied will thus comprise a multiple frequency component which is however relatively small and the invention has for its object to provide improved apparatus of the character above described in which the multiple frequency current is considerably increased and its wave form rendered nearly sinusoidal.

According to the present invention a periodically varying voltage consisting of continuously successive half waves of the frequency to be multiplied and of the same sign together with one or more similar voltages of opposite sign and suitably displaced in phase are arranged to be impressed on the circuit to be supplied with current of multiple frequency, the phase displacement of these voltages causing the resultant current in the circuit to consist of similar positive and negative alternations of mutliple frequency more nearly of sinusoidal form than can be obtained by a single unidirectional voltage wave.

The two or more voltages above referred to must be equally displaced in phase from one another, this phase displacement being for example, 90° in the case of two voltages and 120° in the case of three voltages and these phase-displaced voltages may be derived either from polyphase supply circuits if available or from a single phase supply circuit by providing suitable phase splitting devices.

I shall describe two forms of aparatus embodying my invention and shall then point out the novel features thereof in claim.

Figure 1:
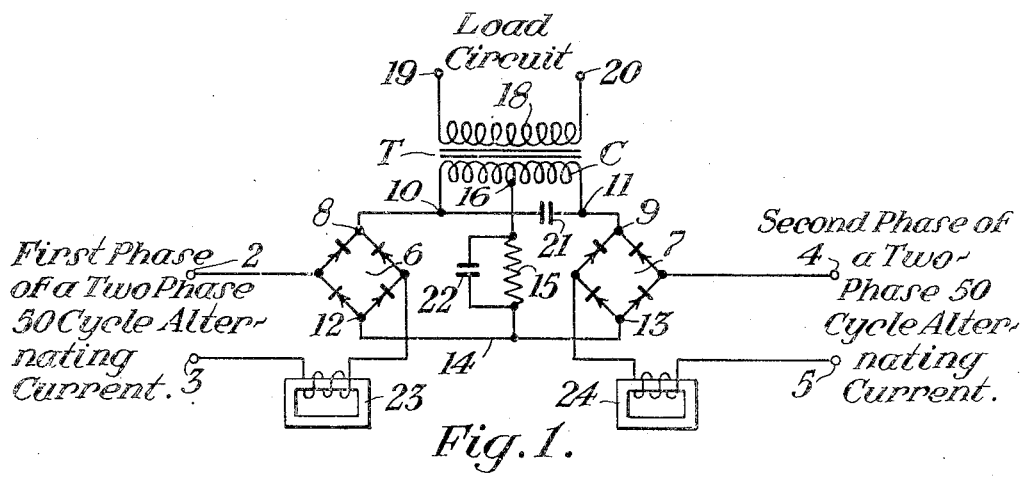
Figure 2:
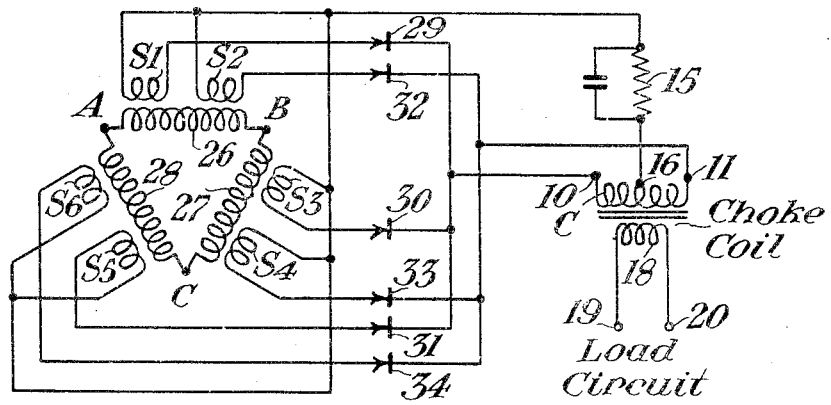
Figure 3:
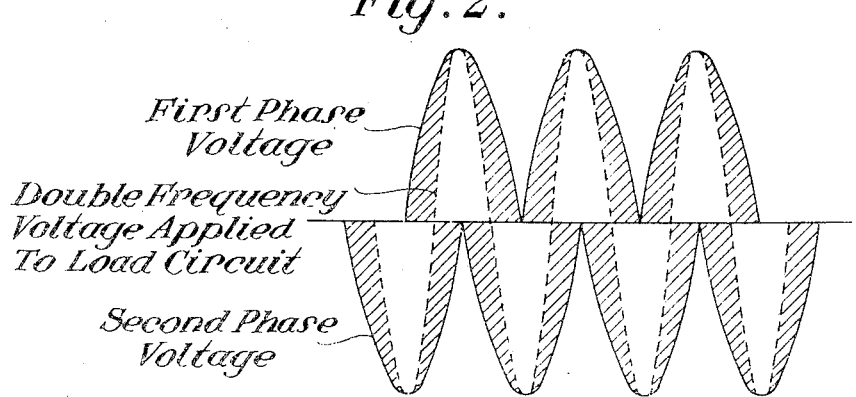

In the accompanying drawings, Fig. 1 is a diagrammatic view showing one form of apparatus embodying the invention when used with a two-phase supply source and Fig. 2 is a diagrammatic view showing a form of apparatus embodying the invention when used with a three-phase supply source. Fig. 3 is a diagram illustrating a characteristic of the apparatus of Fig. 1.

Referring to Fig. 1, terminals 2 and 3 are the terminals of a first phase of a two-phase alternating current supply source, and terminals 4 and 5 are the terminals of a second phase of this two-phase supply source. This alternating current may be, for example, of a frequency of 50 cycles per second.

Terminals 2 and 3 are connected to the input terminals of a first full wave rectifier 6, and terminals 4 and 5 are connected to the input terminals of a second full wave rectifier 7. The positive output terminals 8 and 9 of rectifiers 6 and 7, respectively, are connected to the outside terminals 10 and 11, respectively, of a choke coil C. The negative output terminals 12 and 13 of rectifiers 6 and 7, respectively, are connected together through wire 14 and through a resistor 15 to central terminal 16 of choke coil C.

Choke coil C may be constituted a primary winding of a transformer T having a secondary winding 18 connected to terminals 19 and 20 of a load circuit of any desired nature.

A condenser 21 may be connected across choke coil C, and a condenser 22 may be connected across resistor 15 to improve the operation but such condensers 21 and 22 may not be required.

In operation it is evident that the double frequency voltages at the output terminals of the two rectifiers and impressed upon choke coil C are opposed to each other in sign and owing to their 90° displacement in phase combine to form a double frequency voltage at the terminals of choke coil C and which voltage is of the same amplitude as the original input voltage at the rectifiers but of somewhat more peaked wave form.

This characteristic is illustrated in Fig. 3, as will be apparent by an inspection of the drawing when taken in connection with the foregoing description of the apparatus of Fig. 1.

Resistor 15 serves as a consuming load for the direct current component of the rectifier output.

The wave form of the voltage applied to the load circuit may be improved and rendered substantially sinusoidal by including saturation choke coils 23 and 24 in the input rectifier circuits as described in my copending application for Letters Patent of the United States, Serial No. 591,524, filed May 2, 1945, now Patent 2,420,213, issued May 6, 1947, for Apparatus for frequency multiplication of alternating electric currents. It is apparent that a double frequency alternating voltage is applied to the load circuit, such voltage being substantially sinusoidal.

Referring to Fig. 2, terminals A, B and C are the terminals of a three-phase source of supply not shown. This alternating current may be of any convenient frequency. Windings 26, 27 and 28 are the primary windings of a three-phase transformer which is provided with a hexa-phase secondary winding comprising windings S1 to S6, inclusive. Terminals of alternate windings S1, S3 and S5 are connected through rectifiers 29, 30 and 31 to terminal 10 of choke coil C. Similarly, terminals of windings S2, S4 and S6 are connected through rectifiers 32, 33 and 34 to terminal 11 of coil C. A neutral terminal of each of the secondary windings is connected to central terminal 16 of choke coil C through resistor 15.

In this form of apparatus a composite unidirectional voltage wave of one sign derived from the three-phase source of supply is impressed on one terminal of choke coil C and a similar composite wave of the opposite sign and displaced in phase derived from the three-phase source is impressed on the other terminal of the choke coil. Thus a triple frequency output voltage is delivered from coil C to the load circuit. Resistor 15 constitutes a consuming load for the direct current component. The wave form of the current supplied to the load circuit may be improved by the provision of suitable saturable choke coils connected in the primary winding circuits and operating as described in my copending application referred to hereinbefore.

It is to be understood the invention is not, however, limited to the particular forms here disclosed by way of example.

Although I have herein shown and described only two forms of apparatus embodying my invention, it is understood that various changes and modifications may be made therein within the scope of the appended claim without departing from the spirit and scope of my invention.

Having thus described my invention, what I claim is:

In combination, a two-phase source of alternating current of a given frequency, a first and a second full wave rectifier, said first rectifier having its input terminals connected to a first phase of said source, said second rectifier having its input terminals connected to a second phase of said source, a choke coil having one outside terminal connected to the positive output terminal of said first rectifier and its other outside terminal connected to the positive output terminal of said second rectifier, means including a resistor to connect a mid terminal of said coil to the negative output terminals of said rectifiers, and a load circuit coupled to said choke coil to receive alternating current of double said given frequency due to the voltages made to appear at the output terminals of said coil.

ALEC HERVEY BENNETT WALKER.

REFERENCES CITED

The following references are of record in the file of this patent:

FOREIGN PATENTS

| Number | Country | Date |
|--------|---------|------|
| 767,407 | France | July 17, 1934 |